US012583504B2

(12) United States Patent
Wang et al.

(10) Patent No.: US 12,583,504 B2
(45) Date of Patent: Mar. 24, 2026

(54) STEERING MECHANISM, STEERING SYSTEM, VEHICLE, AND CONTROL METHOD

(71) Applicant: SHENZHEN YINWANG INTELLIGENT TECHNOLOGIES CO., LTD., Shenzhen (CN)

(72) Inventors: Hui Wang, Shanghai (CN); Lulu Yang, Shanghai (CN); Jian Sun, Shanghai (CN); Tianzhu Song, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 515 days.

(21) Appl. No.: 18/179,678

(22) Filed: Mar. 7, 2023

(65) Prior Publication Data

US 2023/0202551 A1      Jun. 29, 2023

Related U.S. Application Data

(63) Continuation of application No. PCT/CN2020/114045, filed on Sep. 8, 2020.

(51) Int. Cl.
B62D 3/12 (2006.01)
B62D 5/04 (2006.01)

(52) U.S. Cl.
CPC .............. B62D 3/12 (2013.01); B62D 5/0433 (2013.01)

(58) Field of Classification Search
CPC .................................... B62D 3/12; B62D 3/02
(Continued)

(56) References Cited

U.S. PATENT DOCUMENTS 6,637,541 B2 * 10/2003 Geyer .................... B62D 9/007
                                                        180/402
9,481,393 B1 * 11/2016 Meyerhoffer ............ B62D 6/00
                        (Continued)

FOREIGN PATENT DOCUMENTS

CN          108248676 A        7/2018
CN          109466621 A        3/2019
                    (Continued)

OTHER PUBLICATIONS

Extended European Search Report in European Appln. No. 20952698. 7, mailed on Aug. 29, 2023, 9 pages.

*Primary Examiner* — Jacob D Knutson
(74) *Attorney, Agent, or Firm* — Fish & Richardson P.C.

(57) ABSTRACT

One example steering mechanism includes a first steering gear, where the first steering gear is configured to convert obtained driving force to transmit driving force to an outer-side wheel during steering, to control steering force applied to the outer-side wheel. The example steering mechanism includes a second steering gear, where the second steering gear is configured to convert obtained driving force to transmit driving force to an inner-side wheel during steering, to control steering force applied to the inner-side wheel. The first steering gear and the second steering gear are connected by using a first clutch. If the first clutch is in a disengaged state, driving force is not transmitted between the first steering gear and the second steering gear. If the first clutch is in an engaged state, driving force is transmitted between the first steering gear and the second steering gear.

19 Claims, 4 Drawing Sheets

100

(58) Field of Classification Search
USPC .......................................... 180/411, 443, 444
See application file for complete search history.

(56)                    References Cited

U.S. PATENT DOCUMENTS

| | | | |
|---|---|---|---|
| 2008/0184838 A1* | 8/2008 | Hayashi ................. | B62D 6/002 |
| | | | 74/484 R |
| 2010/0106375 A1* | 4/2010 | Ahmed .................... | B62D 7/09 |
| | | | 180/444 |
| 2018/0244304 A1 | 8/2018 | Sakamaki et al. | |
| 2019/0092389 A1 | 3/2019 | Mcgill et al. | |

FOREIGN PATENT DOCUMENTS

| | | | | | |
|---|---|---|---|---|---|
| CN | 110435756 A | | 11/2019 | | |
| CN | 110696912 A | * | 1/2020 | ........... | B62D 5/0478 |
| CN | 110723195 A | * | 1/2020 | ......... | B60W 30/182 |
| CN | 111186480 A | | 5/2020 | | |
| KR | 101417083 B1 | * | 7/2014 | ............. | B62D 5/006 |
| WO | 2006085644 A1 | | 8/2006 | | |

* cited by examiner

Controller 600

STEERING MECHANISM, STEERING SYSTEM, VEHICLE, AND CONTROL METHOD

CROSS-REFERENCE TO RELATED APPLICATIONS

This application is a continuation of International Application No. PCT/CN 2020/114045, filed on Sep. 8, 2020, the disclosure of which is hereby incorporated by reference in its entirety.

TECHNICAL FIELD

This application relates to the steering field, and more specifically, to a steering mechanism, a steering system, a vehicle, and a control method.

BACKGROUND

A steering system (steering system) includes a series of apparatuses that are used to change or maintain a travelling direction or a reversing direction of a vehicle. A function of the steering system of the vehicle is to control the travelling direction or the reversing direction of the vehicle according to a driver's willing or a control instruction of an automated driving system. The steering system of the vehicle is of great importance to travelling safety of the vehicle.

In a conventional steering system design, a steering trapezoid structure is generally used to make a steering angle of a vehicle wheel comply with an Ackermann geometric steering angle relationship as far as possible. In this way, each wheel rotates around an instantaneous steering center of the wheel in a steering travelling process of the vehicle. In this case, there is no lateral sliding friction between a tire and a ground, and the tire is in a pure rolling state with minimum friction force. In this state, tire wear is the lowest, and the vehicle has relatively high maneuverability and stability. To implement the steering trapezoid structure, a steering trapezoid rod system is usually mounted in front of two steering wheels, and the steering trapezoid rod system includes mechanical components such as a steering tie rod and a leftward/rightward steering trapezoid arm, so that the two steering wheels are coupled by a mechanical structure. However, in such a structure in which the two steering wheels are coupled by a mechanical mechanism, the steering wheels cannot be independently controlled. Consequently, a steering angle of the vehicle is limited, and it is difficult to meet a current intelligent requirement for the vehicle.

Currently, an independent steering technology is proposed to overcome a disadvantage in the foregoing conventional steering system. In the independent steering technology, a mechanical structure between an inner-side wheel and an outer-side wheel in a steering process is decoupled. In this way, a first driving apparatus may drive a first steering mechanism to implement a steering function of the inner-side wheel, and a second driving apparatus may drive a second steering mechanism to implement a steering function of the outer-side wheel.

However, in such an independent steering technology, because the steering function of the inner-side wheel and the steering function of the outer-side wheel are separately implemented by using independent steering mechanisms, to enable the vehicle to meet an Ackermann steering geometric relationship in the steering process, steering mechanisms corresponding to wheels need to cooperate with each other, and a requirement for control precision of the steering mechanism is relatively high, and consequently, costs of the steering mechanism are improved.

SUMMARY

This application provides a steering mechanism, a steering system, a vehicle, and a control method, to reduce costs of a steering mechanism for implementing an independent steering technology.

According to a first aspect, a steering mechanism is provided and includes: a first steering gear 110, where the first steering gear 110 is configured to convert obtained driving force to transmit driving force to an outer-side wheel 114 during steering, to control steering force applied to the outer-side wheel 114; and a second steering gear 120, where the second steering gear 120 is configured to convert obtained driving force to transmit driving force to an inner-side wheel 124 during steering, to control steering force applied to the inner-side wheel 124; where The first steering gear 110 and the second steering gear 120 are connected by using the first clutch 130, and if the first clutch 130 is in a disengaged state, driving force is not transmitted between the first steering gear 110 and the second steering gear 120, or if the first clutch 130 is in an engaged state, driving force is transmitted between the first steering gear 110 and the second steering gear 120.

In this embodiment of this application, the first steering gear 110 and the second steering gear 120 are connected by using the first clutch 130, and a status of the first clutch 130 is controlled to control whether driving force is transmitted between the first steering gear 110 and the second steering gear 120. In this way, when steering gears corresponding to wheels need to cooperate with each other, the first clutch 130 may be directly controlled to be in the engaged state, so that the steering gears corresponding to the wheels cooperate with each other by using a mechanical structure between the steering gears. In this way, a requirement for control precision of the steering mechanism is reduced, and costs of the steering mechanism are reduced.

In another aspect, in an existing technology, whether driving force is transmitted between the first steering gear 110 and the second steering gear 120 is controlled by using a hydraulic system. Compared with the hydraulic system, the first clutch 130 has a more compact structure, thereby helping reduce a volume of the steering mechanism.

In a possible implementation, the first steering gear 110 includes a first transmission member 111 and a second transmission member 112 that are in a transmission connection, and the first transmission member 111 is configured to apply obtained first driving force to an outer-side wheel 114 by using the second transmission member 112; and the second steering gear 120 includes a third transmission member 121 and a fourth transmission member 122 that are in a transmission connection, the third transmission member 121 is configured to apply obtained second driving force to an inner-side wheel 124 by using the fourth transmission member 122, and the first transmission member 111 and the third transmission member 121 are connected by using the first clutch 130.

In this embodiment of this application, the first transmission member 111 and the third transmission member 121 are connected by using the first clutch 130, thereby helping control whether driving force is transmitted between the two steering gears.

In a possible implementation, when the first clutch 130 is in the engaged state, the first driving force obtained by the first transmission member 111 is transmitted to the third transmission member 121 by using the first clutch 130.

In this embodiment of this application, when the first clutch 130 is in the engaged state, the first driving force obtained by the first transmission member 111 is transmitted to the third transmission member 121 by using the first clutch 130, to provide the steering force for the inner-side wheel 124, so that the inner-side wheel and the outer-side wheel in a steering process may meet an Ackermann steering geometric relationship by using a mechanical coupling structure. In this way, there is no need to depend on control precision of a controller for the steering mechanism to meet the Ackermann steering geometric relationship, thereby helping reduce costs of the steering mechanism.

In a possible implementation, the steering mechanism includes a first driving apparatus 115. The first driving apparatus 115 drives, by providing third driving force for the second transmission member 112, the second transmission member 112 to move. The second transmission member 112 transmits the third driving force to the first transmission member 111, so that the first transmission member 111 obtains the first driving force. The first transmission member 111 transmits the first driving force to the third transmission member 121 by using the first clutch 130.

In this embodiment of this application, the first driving apparatus 115 may provide the third driving force for the second transmission member 112, and finally transmit the driving force to the third transmission member 121 by using the first transmission member 111, to provide the steering force for the inner-side wheel 124 by using the fourth transmission member 122, thereby helping improve redundancy performance of a steering system.

In a possible implementation, when the first clutch 130 is in the engaged state, the second driving force obtained by the third transmission member 121 is transmitted to the first transmission member 111 by using the first clutch 130.

In this embodiment of this application, when the first clutch 130 is in the engaged state, the second driving force obtained by the third transmission member 121 is transmitted to the first transmission member 111 by using the first clutch 130, to provide the steering force for the outer-side wheel 114, so that the inner-side wheel and the outer-side wheel in a steering process may meet an Ackermann steering geometric relationship by using a mechanical coupling structure. In this way, there is no need to depend on control precision of a controller for the steering mechanism to meet the Ackermann steering geometric relationship, thereby helping reduce costs of the steering mechanism.

In a possible implementation, the steering mechanism includes a second driving apparatus 125. The second driving apparatus 125 drives, by providing fourth driving force for the fourth transmission member 122, the fourth transmission member 122 to move. The fourth transmission member 122 transmits the fourth driving force to the third transmission member 121, so that the third transmission member 121 obtains the second driving force. The third transmission member 121 transmits the second driving force to the first transmission member 111 by using the first clutch 130.

In this embodiment of this application, the second driving apparatus 125 may provide the fourth driving force for the fourth transmission member 122, and finally transmit the driving force to the second transmission member 112 by using the first transmission member 111, to provide the steering force for the outer-side wheel 114, thereby helping improve redundancy performance of a steering system.

In a possible implementation, the steering mechanism includes a first driving apparatus 115 and a second driving apparatus 125. When the first clutch 130 is in the disengaged state, the first driving apparatus 115 drives the second transmission member 112 to move, to control the steering force applied to the outer-side wheel 114; and/or the second driving apparatus 125 drives the fourth transmission member 122 to move, to control the steering force applied to the inner-side wheel 124.

In this embodiment of this application, when the first clutch 130 is in the disengaged state, the first driving apparatus 115 and the second driving apparatus 125 may respectively drive the outer-side wheel 114 and the inner-side wheel 124 independently, so that the outer-side wheel 114 and the inner-side wheel 124 steer at any angle.

In a possible implementation, the first transmission member 111 is a first gear, and the second transmission member 112 is a first rack; or the third transmission member 121 is a second gear, and the fourth transmission member 122 is a second rack.

In this embodiment of this application, use of a steering gear based on a gear and a rack helps simplify a structure of the steering gear.

According to a second aspect, a steering system is provided, and includes an inner-side wheel 124, an outer-side wheel 114, and the steering mechanism in the foregoing first aspect, where the steering mechanism is configured to control rotation of the inner-side wheel 124 and the outer-side wheel 114.

In a possible implementation, the steering system further includes a first steering wheel 1. The first steering wheel 1 is connected to the first transmission member 111 by using a first steering drag link 152. A second clutch 150 is disposed on the first steering drag link 152. If the second clutch 150 is in an engaged state, the first steering wheel 1 provides first driving force for the first transmission member 111 by using the first steering drag link 152. If the second clutch 150 is in a disengaged state, the first steering wheel 1 cannot provide first driving force for the first transmission member 111 by using the first steering drag link 152.

In this embodiment of this application, the second clutch 150 is disposed on the first steering drag link 152, and a working status of the second clutch 150 is controlled, so that the steering system is changed to work in a steer-by-wire mode or a mechanical steering mode.

In a possible implementation, the steering system further includes a second steering wheel. The second steering wheel is connected to the third transmission member 121 by using a second steering drag link. A third clutch is disposed on the second steering drag link. If the third clutch is in an engaged state, the second steering wheel provides second driving force for the third transmission member 121 by using the second steering drag link. If the third clutch is in a disengaged state, the second steering wheel cannot provide second driving force for the third transmission member 121 by using the second steering drag link.

In this embodiment of this application, the third clutch is disposed on the second steering drag link, and a working status of the second clutch 150 is controlled, so that the steering system is changed to work in a steer-by-wire mode or a mechanical steering mode.

According to a third aspect, a control method for a steering system is provided, and the steering system includes: a first steering gear 110, where the first steering gear 110 is configured to convert obtained driving force to transmit driving force to an outer-side wheel 114 during steering, to control steering force applied to the outer-side wheel 114; and a second steering gear 120, where the second steering gear 120 is configured to convert obtained driving force to transmit driving force to an inner-side wheel (124) during steering, to control steering force applied to the inner-side wheel 124, and the first steering gear 110 and the second steering gear 120 are connected by using the first clutch 130. The control method includes: A controller controls the first clutch 130 to be in a disengaged state, so that driving force is not transmitted between the first steering gear 110 and the second steering gear 120; and the controller controls the first clutch 130 to be in an engaged state, so that driving force is transmitted between the first steering gear 110 and the second steering gear 120.

In this embodiment of this application, the first steering gear 110 and the second steering gear 120 are connected by using the first clutch 130, and a status of the first clutch 130 is controlled to control whether driving force is transmitted between the first steering gear 110 and the second steering gear 120. In this way, when steering gears corresponding to wheels need to cooperate with each other, the first clutch 130 may be directly controlled to be in the engaged state, so that the steering gears corresponding to the wheels cooperate with each other by using a mechanical structure between the steering gears. In this way, a requirement for control precision of a steering mechanism is reduced, and costs of the steering mechanism are reduced.

In another aspect, in an existing technology, whether driving force is transmitted between the first steering gear 110 and the second steering gear 120 is controlled by using a hydraulic system. Compared with the hydraulic system, the first clutch 130 has a more compact structure, thereby helping reduce a volume of the steering mechanism.

In a possible implementation, the first steering gear 110 includes a first transmission member 111 and a second transmission member 112 that are in a transmission connection, and the first transmission member 111 is configured to apply obtained first driving force to an outer-side wheel 114 by using the second transmission member 112; and the second steering gear 120 includes a third transmission member 121 and a fourth transmission member 122 that are in a transmission connection, the third transmission member 121 is configured to apply obtained second driving force to an inner-side wheel 124 by using the fourth transmission member 122, and the first transmission member 111 and the third transmission member 121 are connected by using the first clutch 130.

In this embodiment of this application, the first transmission member 111 and the third transmission member 121 are connected by using the first clutch 130, thereby helping control whether driving force is transmitted between the two steering gears.

In a possible implementation, that the controller controls the first clutch 130 to be in an engaged state includes: The controller controls the first clutch 130 to be in the engaged state, so that the first driving force obtained by the first transmission member 111 is transmitted to the third transmission member 121 by using the first clutch 130.

In this embodiment of this application, when the first clutch 130 is in the engaged state, the first driving force obtained by the first transmission member 111 is transmitted to the third transmission member 121 by using the first clutch 130, to provide the steering force for the inner-side wheel 124, so that the inner-side wheel and the outer-side wheel in a steering process may meet an Ackermann steering geometric relationship by using a mechanical coupling structure. In this way, there is no need to depend on control precision of a controller for the steering mechanism to meet the Ackermann steering geometric relationship, thereby helping reduce costs of the steering mechanism.

In a possible implementation, the steering system includes a first driving apparatus 115, and the method further includes: The controller controls the first driving apparatus 115 to provide third driving force for the second transmission member 112, to drive the second transmission member 112 to move, so that the second transmission member 112 transmits the third driving force to the first transmission member 111, and the first transmission member 111 obtains the first driving force.

In this embodiment of this application, the first driving apparatus 115 may provide the third driving force for the second transmission member 112, and finally transmit the driving force to the third transmission member 121 by using the first transmission member 111, to provide the steering force for the inner-side wheel 124 by using the fourth transmission member 122, thereby helping improve redundancy performance of the steering system.

In a possible implementation, that the controller controls the first clutch 130 to be in an engaged state includes: The controller controls the first clutch 130 to be in the engaged state, so that the second driving force obtained by the third transmission member 121 is transmitted to the first transmission member 111 by using the first clutch 130.

In this embodiment of this application, when the first clutch 130 is in the engaged state, the second driving force obtained by the third transmission member 121 is transmitted to the first transmission member 111 by using the first clutch 130, to provide the steering force for the outer-side wheel 114, so that the inner-side wheel and the outer-side wheel in a steering process may meet an Ackermann steering geometric relationship by using a mechanical coupling structure. In this way, there is no need to depend on control precision of a controller for the steering mechanism to meet the Ackermann steering geometric relationship, thereby helping reduce costs of the steering mechanism.

In a possible implementation, the steering system includes a second driving apparatus 125, and the method further includes: The controller controls the second driving apparatus 125 to provide fourth driving force for the fourth transmission member 122 to drive the fourth transmission member 122 to move and transmit the fourth driving force to the third transmission member 121, so that the third transmission member 121 obtains the second driving force.

In this embodiment of this application, the second driving apparatus 125 may provide the fourth driving force for the fourth transmission member 122, and finally transmit the driving force to the second transmission member 112 by using the first transmission member 111, to provide the steering force for the outer-side wheel 114, thereby helping improve redundancy performance of the steering system.

In a possible implementation, the steering system includes a first driving apparatus 115 and a second driving apparatus 125, and the method further includes: When the first clutch 130 is in the disengaged state, the controller controls the first driving apparatus 115 to drive the second transmission member 112 to move, to control the steering force applied to the outer-side wheel 114, and/or the controller controls the second driving apparatus 125 to drive the fourth transmission member 122 to move, to control the steering force applied to the inner-side wheel 124.

In this embodiment of this application, when the first clutch 130 is in the disengaged state, the first driving apparatus 115 and the second driving apparatus 125 may respectively drive the outer-side wheel 114 and the inner-side wheel 124 independently, so that the outer-side wheel 114 and the inner-side wheel 124 steer at any angle.

In a possible implementation, the first transmission member 111 is a first gear, and the second transmission member 112 is a first rack; or the third transmission member 121 is a second gear, and the fourth transmission member 122 is a second rack.

In this embodiment of this application, use of a steering gear based on a gear and a rack helps simplify a structure of the steering gear.

According to a fourth aspect, a vehicle is provided, including the steering system in any possible implementation of the second aspect.

According to a fifth aspect, a control apparatus is provided, where the control apparatus includes a processing unit and a storage unit, the storage unit is configured to store instructions, and the processing unit executes the instructions stored in the storage unit, so that the control apparatus is enabled to perform any possible method in the third aspect.

Optionally, the control apparatus may be an independent controller in a vehicle, or may be a chip that has a control function in the vehicle. The processing unit may be a processor, the storage unit may be a memory, and the memory may be a storage unit (for example, a register or a cache) in the chip, or may be a storage unit (for example, a read-only memory or a random access memory) that is in the vehicle and that is outside the chip.

It should be noted that the memory in the control apparatus is coupled to the processor. That the memory is coupled to the processor may be understood as follows: The memory is located inside the processor, or the memory is located outside the processor and therefore is independent of the processor.

According to a sixth aspect, a computer program product is provided. The computer program product includes computer program code. When the computer program code is run on a computer, the computer is enabled to perform the methods in the foregoing aspects.

It should be noted that some or all of the computer program code may be stored in a first storage medium. The first storage medium may be encapsulated with a processor, or encapsulated separately from a processor. This is not specifically limited in this embodiment of this application.

According to a seventh aspect, a computer-readable medium is provided. The computer-readable medium stores program code, and when the computer program code is run on a computer, the computer is enabled to perform the methods in the foregoing aspects.

DESCRIPTION OF EMBODIMENTS

Figure 1:
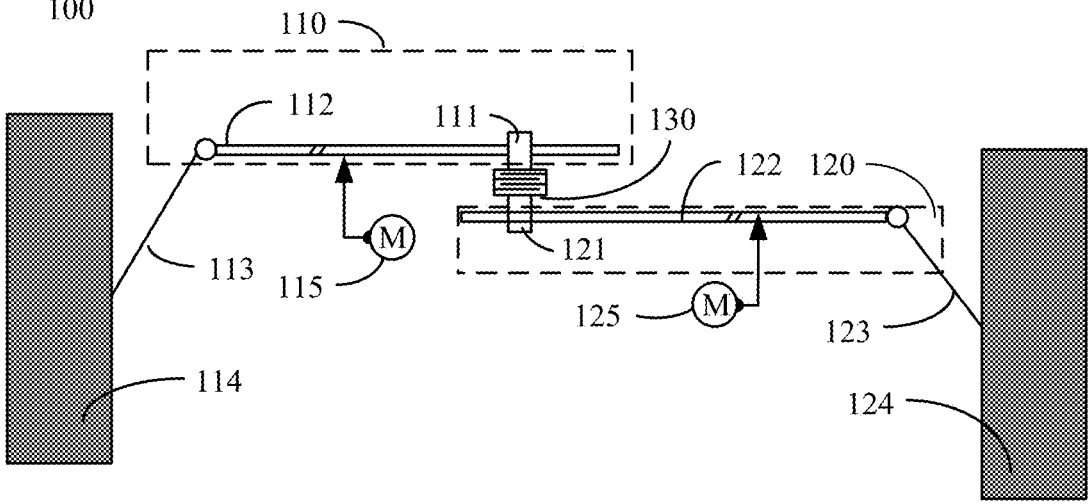
FIG. 1 is a schematic diagram of a steering mechanism 100 according to an embodiment of this application.

The following describes the technical solutions of this application with reference to the accompanying drawings.

As described above, in an existing independent steering technology, a mechanical structure between an inner-side wheel and an outer-side wheel in a steering process is decoupled. In this way, a first driving apparatus may drive a first steering mechanism to implement a steering function of the inner-side wheel, and a second driving apparatus may drive a second steering mechanism to implement a steering function of the outer-side wheel. However, in such an independent steering technology, because the steering function of the inner-side wheel and the steering function of the outer-side wheel are separately implemented by using independent steering mechanisms, to enable the vehicle to meet an Ackermann steering geometric relationship in the steering process, steering mechanisms corresponding to wheels need to cooperate with each other, and a requirement for control precision of the steering mechanism is relatively high, and consequently, costs of the steering mechanism are improved.

To reduce costs of a steering mechanism for implementing the independent steering technology, this application provides a new steering mechanism. A first transmission member 111 that provides first steering force for an outer-side wheel 114 and a third transmission member 121 that provides second steering force for an inner-side wheel 124 are connected by using a first clutch 130. In this way, the first clutch 130 may be controlled to be in an engaged state or a disengaged state, to control mechanical coupling or mechanical decoupling between the first transmission member 111 and the third transmission member 121. In this way, when steering mechanisms corresponding to wheels need to cooperate with each other, the first clutch 130 may be controlled to be in the engaged state to control steering of the inner-side wheel and the outer-side wheel through mechanical coupling, to reduce a requirement for control precision of the steering mechanism, thereby helping reduce costs of the steering mechanism.

A steering mechanism according to an embodiment of this application is described below with reference to FIG. 1. FIG. 1 is a schematic diagram of a steering mechanism 100 according to an embodiment of this application. The steering mechanism 100 shown in FIG. 1 includes a first steering gear 110, a second steering gear 120, and a first clutch 130.

The first steering gear 110 is configured to convert obtained driving force to transmit driving force to an outer-side wheel 114 during steering, to control steering force applied to the outer-side wheel 114.

The second steering gear 120 is configured to convert obtained driving force to transmit driving force to an inner-side wheel 124 during steering, to control steering force applied to the inner-side wheel 124.

The first steering gear 110 and the second steering gear 120 are connected by using the first clutch 130, and if the first clutch 130 is in a disengaged state, driving force is not transmitted between the first steering gear 110 and the second steering gear 120, or if the first clutch 130 is in an engaged state, driving force is transmitted between the first steering gear 110 and the second steering gear 120.

That if the first clutch 130 is in the disengaged state, driving force is not transmitted between the first steering gear 110 and the second steering gear 120 may be understood as follows: When the first clutch 130 is in the disengaged state, the first steering gear 110 and the second steering gear 120 are mechanically decoupled, and the first steering gear 110 and the second steering gear 120 independently provide steering force for the corresponding wheels 114 and 124.

In this embodiment of this application, when the first clutch 130 is in the disengaged state, because the first steering gear 110 and the second steering gear 120 are mechanically decoupled, the first steering gear 110 and the second steering gear 120 may independently control corresponding wheels to perform steering.

That if the first clutch 130 is in the engaged state, driving force is transmitted between the first steering gear 110 and the second steering gear 120 may be understood as follows: When the first clutch 130 is in the engaged state, the first steering gear 110 and the second steering gear 120 are mechanically coupled, and in this case, first steering force obtained by a first transmission member 111 may be transmitted to a third transmission member 121 by using the first clutch 130, or second steering force obtained by a third transmission member 121 may be transmitted to a first transmission member 111 by using the first clutch 130.

In this embodiment of this application, when the first clutch 130 is in the engaged state, because the first steering gear 110 and the second steering gear 120 are mechanically coupled, the inner-side wheel and the outer-side wheel in a steering process may meet an Ackermann steering geometric relationship by using a mechanical coupling structure. In this way, there is no need to depend on control precision of a controller for the steering mechanism to meet the Ackermann steering geometric relationship, thereby helping reduce costs of the steering mechanism.

The outer-side wheel 114 and the inner-side wheel 124 during steering are described for a steering direction of a vehicle. For example, when the vehicle turns right in a travelling direction of the vehicle, the outer-side wheel 114 may be a left front wheel of the vehicle, and correspondingly, the inner-side wheel 124 may be a right front wheel of the vehicle. For another example, when the vehicle turns left in a traveling direction, the outer-side wheel 114 may be a right front wheel of the vehicle, and correspondingly, the inner-side wheel 124 may be a left front wheel of the vehicle. Certainly, the inner-side wheel and the outer-side wheel may alternatively be rear wheels of the vehicle. This is not limited in this embodiment of this application.

That the first steering gear 110 and/or the second steering gear 120 are/is configured to convert the obtained driving force may be understood as follows: The steering gear is configured to appropriately transform a steering torque and a steering angle that are from a steering wheel or a driving apparatus. For example, a speed is decreased and the torque is increased, and then the transformed steering torque and the transformed steering angle are applied to a corresponding wheel.

Generally, the steering gear may include a transmission member for transmitting driving force. Optionally, the first steering gear 110 includes a first transmission member 111 and a second transmission member 112 that are in a transmission connection, and the first transmission member 111 is configured to apply obtained first driving force to the outer-side wheel 114 by using the second transmission member 112. The second steering gear 120 includes a third transmission member 121 and a fourth transmission member 122 that are in a transmission connection, and the third transmission member 121 is configured to apply obtained second driving force to the inner-side wheel 124 by using the fourth transmission member 122.

The first steering gear 110 and the second steering gear 120 may be connected by using the first clutch 130 in a plurality of manners. This is not specifically limited in this embodiment of this application. For example, the first transmission member 111 and the third transmission member 121 are connected by using the first clutch 130. For another example, the first transmission member 111 and the fourth transmission member 122 are connected by using the first clutch 130. For example, the third transmission member 121 and the second transmission member 112 are connected by using the first clutch 130.

Generally, steering gears may be classified into different types based on different transmission members. Currently, common steering gears include a gear-rack steering gear, a worm crank steering gear, and the like. Specific types of the first steering gear 110 and the second steering gear 120 are not limited in this embodiment of this application. In addition, the first steering gear 110 and the second steering gear 120 may be steering gears of a same type, or may be steering gears of different types. This is not limited in this embodiment of this application.

If the first steering gear 110 and the second steering gear 120 are gear-rack steering gears, for the first steering gear 110, the first transmission member 111 may be a gear, and the second transmission member 112 may be a rack; and for the second steering gear 120, the third transmission member 121 may be a gear, and the fourth transmission member 122 may be a rack.

When the first clutch 130 is in the engaged state, driving force transmission between the first transmission member 111 and the third transmission member 121 may be divided into two cases.

Case 1: The first driving force obtained by the first transmission member 111 is transmitted to the third transmission member 121 by using the first clutch 130, so that the third transmission member 121 obtains the second driving force, and transmits the second driving force to the fourth transmission member 122, to control the steering force applied to the inner-side wheel.

It should be noted that the first driving force obtained by the first transmission member 111 may be provided by a steering wheel by using a steering rod system, or may be provided by a driving apparatus in a steering system.

If the first driving force is provided by the driving apparatus, the first driving force may be directly provided by the driving apparatus, or the driving apparatus may drive the second transmission member 112 to move, so that the first driving force is transmitted to the first transmission member 111. To be specific, the steering mechanism includes a first driving apparatus 115, and the first driving apparatus 115 provides third driving force for the second transmission member 112 to drive the second transmission member 112 to move; the second transmission member 112 transmits the third driving force to the first transmission member 111, so that the first transmission member 111 obtains the first driving force; and the first transmission member 111 transmits the first driving force to the third transmission member 121 by using the first clutch 130.

Case 2: The second driving force obtained by the third transmission member 121 is transmitted to the first transmission member 111 by using the first clutch 130, so that the first transmission member 111 obtains the first driving force, and transmits the first driving force to the second transmission member 112, to control the steering force applied to the outer-side wheel.

It should be noted that the second driving force may be directly provided by a steering wheel for the third transmission member 121 by using a steering rod system, or may be provided by a driving apparatus to the third transmission member 121.

If the second driving force is provided by the driving apparatus, the second driving force may be directly provided by the driving apparatus, or the driving apparatus may drive the fourth transmission member 122 to move, so that the second driving force is transmitted to the second transmission member 112. To be specific, the steering mechanism includes a second driving apparatus 125, and the second driving apparatus 125 provides fourth driving force for the fourth transmission member 122 to drive the fourth transmission member 122 to move; the fourth transmission member 122 transmits the fourth driving force to the third transmission member 121, so that the third transmission member 121 obtains the second driving force; and the third transmission member 121 transmits the second driving force to the first transmission member 111 by using the first clutch 130.

When the first clutch 130 is in the disengaged state, the first driving apparatus 115 drives the second transmission member 112 to move, to control the steering force applied to the outer-side wheel 114, and the second driving apparatus 125 drives the fourth transmission member 122 to move, to control the steering force applied to the inner-side wheel 124.

Optionally, the first steering gear 110 may be connected to the outer-side wheel 114 by using a first steering tie rod 113, and the first steering gear 110 drives the first steering tie rod 113 to move, to control the steering force applied to the outer-side wheel 114. Correspondingly, the second steering gear 120 may be connected to the inner-side wheel 124 by using a second steering tie rod 123, and the second steering gear 120 drives the second steering tie rod 123 to move, to control the steering force applied to the inner-side wheel 124.

Figure 2:
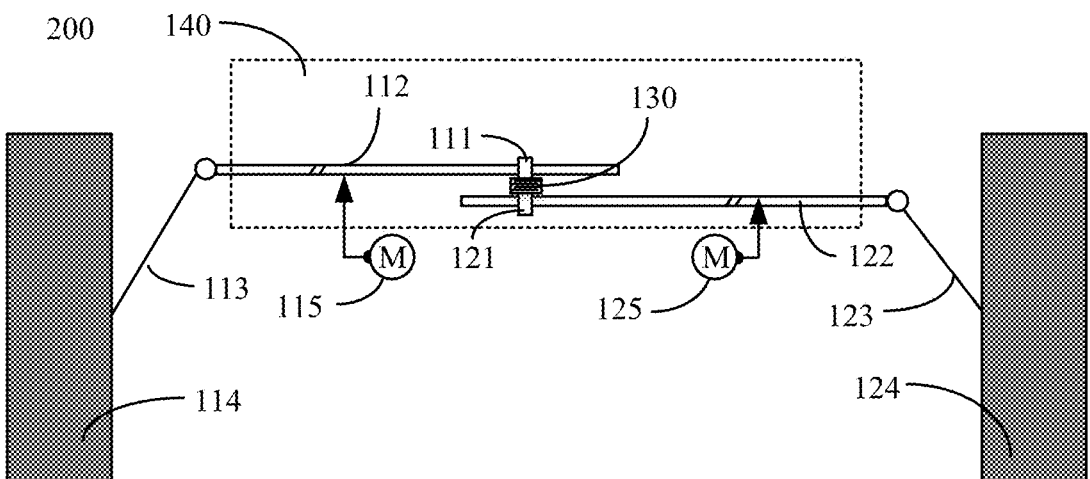
FIG. 2 is a schematic diagram of a steering mechanism 200 according to another embodiment of this application.

Generally, to protect a working status of each component in the foregoing steering mechanism, sleeves 140 may be disposed outside the first steering gear 110, the second steering gear 120, and the first clutch 130. For a specific structure of the sleeve 140, refer to the steering mechanism 200 shown in FIG. 2.

The steering mechanism in the embodiments of this application is described above with reference to FIG. 1 and FIG. 2. A steering system including the steering mechanism 200 is used as an example for description below with reference to FIG. 3. It should be noted that an element in the steering system shown in FIG. 3 that has a same function as that in the foregoing steering mechanism uses a same number. For brevity, elements already involved in the foregoing steering mechanism are not specifically described below. In addition, the steering system in this embodiment of this application may directly include the steering mechanism 100. Because a connection relationship between elements and a function of the element are similar to those in a steering system that includes the steering mechanism 200, details are not specifically described below.

Figure 3:
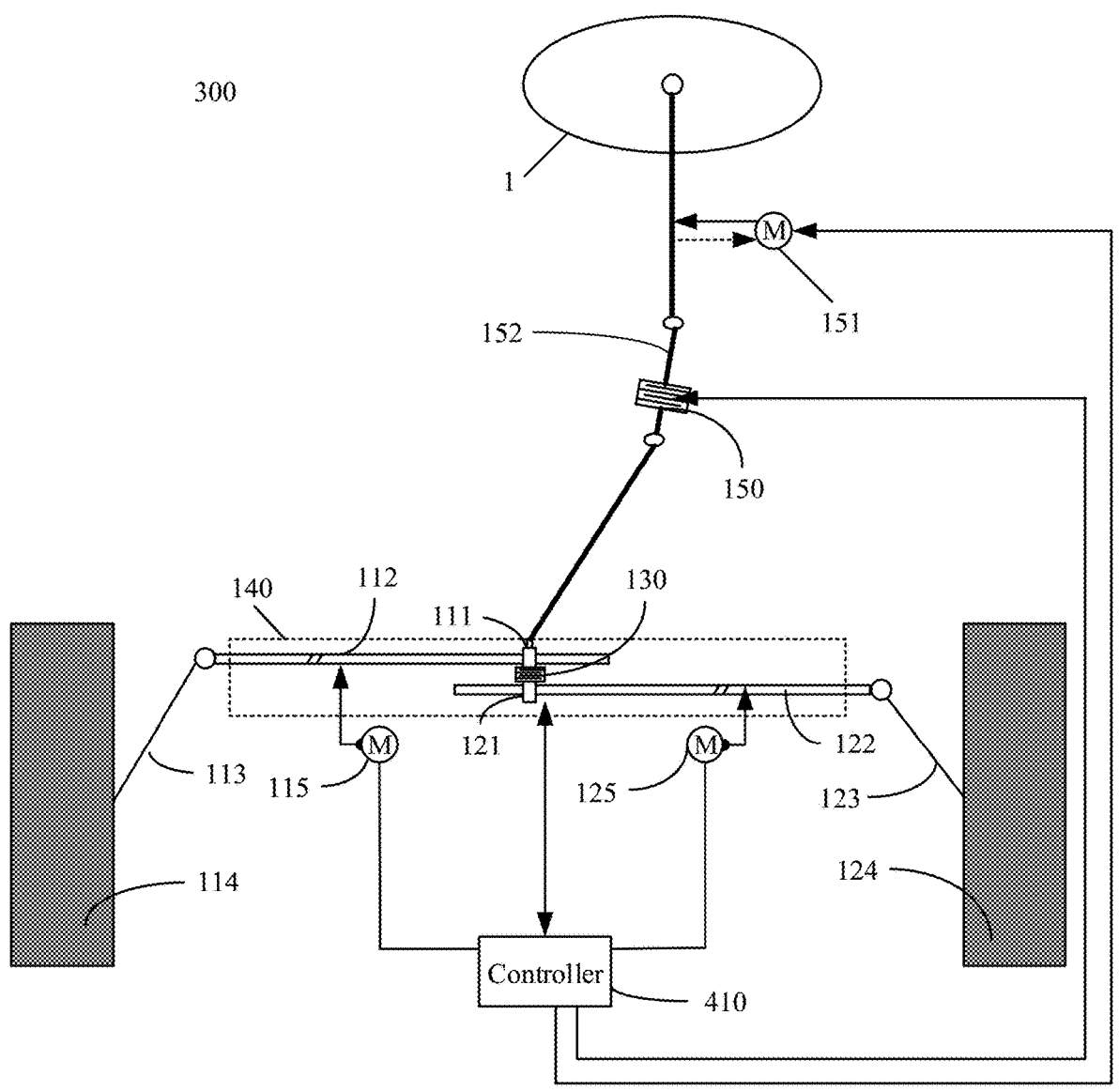
FIG. 3 is a schematic diagram of a steering system according to an embodiment of this application.

FIG. 3 is a schematic diagram of a steering system according to an embodiment of this application. A steering system 300 shown in FIG. 3 includes an inner-side wheel 124, an outer-side wheel 114, and a steering mechanism 200.

Optionally, the steering system further includes a first steering wheel 1, and the first steering wheel 1 is connected to a first transmission member 111 by using a first steering rod system, to provide first driving force for the first transmission member 111.

Correspondingly, if a first clutch 130 is in an engaged state, the first driving force obtained by the first transmission member 111 may be transmitted to a third transmission member 121 by using the first clutch 130, to provide second driving force for the third transmission member 121.

To meet a requirement of an automated driving technology for the steering system, the steering system needs to work in a steer-by-wire mode or a mechanical steering mode. In other words, a clutch may be disposed on a steering drag link in the steering system. In this way, if the clutch is in a disengaged state, the steering system may work in the steer-by-wire mode, and if the clutch is in the engaged state, the steering system may work in the mechanical steering mode.

Referring to FIG. 3, the first steering wheel 1 is connected to the first transmission member 111 by using a first steering drag link 152. A second clutch 150 is disposed on the first steering drag link 152. If the second clutch 150 is in an engaged state, the first steering wheel 1 provides the first driving force for the first transmission member 111 by using the first steering drag link 152. If the second clutch is in a disengaged state, the first steering wheel 1 cannot provide the first driving force for the first transmission member 111 by using the first steering drag link 152.

Certainly, the steering wheel may also be connected to the third transmission member 121 by using a second steering drag link. In other words, a second steering wheel is connected to the third transmission member 121 by using the second steering drag link. A third clutch is disposed on the second steering drag link. If the third clutch is in an engaged state, the second steering wheel provides the second driving force for the third transmission member 121 by using the second steering drag link. If the third clutch is in a disengaged state, the second steering wheel cannot provide the second driving force for the third transmission member 121 by using the second steering drag link.

In this embodiment of this application, an engagement degree of the second clutch 150 may be controlled, and magnitudes of force fed back by the inner-side wheel and the outer-side wheel to a steering wheel may be controlled, to adapt to driving habits of different drivers and improve driving experience.

Optionally, the steering system may further include a driving apparatus 151. If the steering system works in the steer-by-wire mode, the driving apparatus 151 may implement functions such as road sense simulation or angle following of the steering wheel. If the steering system works in the mechanical steering mode, the driving apparatus 151 may be further configured to assist with steering, that is, provide steering force for the steering drag link based on a steering requirement that is input by a driver by using the steering wheel.

A structure of the steering system in the embodiments of this application is described above, and a working mode supported by the steering system 300 is described below with reference to FIG. 3. The working mode supported by the steering system 300 includes one or more of a mechanical steering mode, an independent steering angle control mode, and a steer-by-wire mode.

In the mechanical steering mode, the first clutch 130 and the second clutch 150 are controlled to be in an engaged state. When the driver rotates the steering wheel 1, a steering torque or a steering angle generated by the steering wheel 1 is transmitted to the first transmission member 111 by using the second clutch 150, to provide the first driving force for the first transmission member 111, and the first transmission member 111 separately transmits the first driving force to the second transmission member 112 and the third transmission member 121. Accordingly, the second transmission member 112 controls, under the action of the first driving force, steering force applied to the outer-side wheel 114. Accordingly, the third transmission member 121 transmits the second driving force to the fourth transmission member 122, so that the fourth transmission member 122 controls, under the action of the second driving force, steering force applied to the inner-side wheel 124.

It should be noted that, in the mechanical steering mode, a steering angle relationship between the inner-side wheel and the outer-side wheel is determined by a preset parameter of a steering trapezoid.

In addition, a controller 410 may control, based on a control requirement, both the first driving apparatus 115 and the second driving apparatus 125 to be in a steering assistance mode. Certainly, the controller 410 may further control one of the driving apparatuses to be in the assistance mode, and control the other driving apparatus to be in a redundant mode. After the driving apparatus in the assistance mode is faulty, the driving apparatus in the redundant mode may be controlled to be in the assistance mode, to improve security of the steering system.

As described above, in the mechanical steering mode, the steering wheel is in a mechanical connection state with the inner-side wheel and the outer-side wheel, and the driver may obtain real road sense by using the steering wheel. Therefore, the driving apparatus 151 may be in a non-working state or a steering assistance working mode, to reduce energy consumption of the steering system.

In the independent steering angle control mode, the first clutch 130 is controlled to be in a disengaged state. The first driving apparatus 115 drives the second transmission member 112 to move. The second transmission member 112 drives, based on obtained driving force, the first steering tie rod 113 to move, and controls, by using the first steering tie rod 113, the steering force applied to the outer-side wheel 114. The second driving apparatus 125 drives the fourth transmission member 122 to move. The fourth transmission member 122 drives, based on obtained driving force, the second steering tie rod 123 to move, and controls, by using the second steering tie rod 123, the steering force applied to the inner-side wheel 124.

It should be noted that, in the independent steering angle control mode, the inner-side wheel and the outer-side wheel are mechanically decoupled, and a steering angle of the inner-side wheel and a steering angle of the outer-side wheel may be determined by the controller based on a control requirement. For example, the controller may determine the steering angle of the inner-side wheel and the steering angle of the outer-side wheel based on a running condition of a vehicle.

Generally, the independent steering angle control mode is applicable to scenarios such as adaptive adjustment, large steering angle steering, and 90-degree steering. In an adaptive adjustment scenario, the steering wheel may be in a zero position, both the first clutch 130 and the second clutch 150 are in a disengaged state, the first driving apparatus 115 and the second driving apparatus 125 separately drive the second transmission member 112 and the fourth transmission member 122 based on a vehicle status such as vehicle load and tire pressure, and adaptively adjust the steering angle of the inner-side wheel and the steering angle of the outer-side wheel.

In scenarios of large steering angle steering and 90-degree steering, both the first clutch 130 and the second clutch 150 are in a disengaged state. The controller may control, based on a target steering angle and an allowed steering space envelope, the first driving apparatus 115 and the second driving apparatus 125 to drive the second transmission member 112 and the fourth transmission member 122 to move in a same direction or reverse directions, to drive the inner-side wheel and the outer-side wheel to perform steering motion with a large angle. Functions of the vehicle such as horizontal travelling, oblique travelling, and circling in space can be implemented, mobility performance of the vehicle is improved, and a limitation on a place/space requirement of a scenario such as automated parking or small-radius steering is reduced.

In the steer-by-wire mode, the second clutch 150 is in a disengaged state, and a steering wheel cannot directly drive, by using a mechanical connection, the inner-side wheel and the outer-side wheel to perform steering. In this case, a status of the first clutch 130 may be divided into two cases: an engaged state or a disengaged state.

When the first clutch 130 is in the disengaged state, a driving force transmission manner in the steering system is similar to a driving force transmission manner in the foregoing independent steering angle control mode; in other words, the two driving apparatuses separately drive the second transmission member 112 and the fourth transmission member 122. For brevity, details are not described herein again.

When the first clutch 130 is in the engaged state, a driving force transmission manner in the steering system is similar to a driving force transmission manner in the foregoing mechanical steering mode. For brevity, details are not described herein again. In addition, working manners of the first driving apparatus 115 and the second driving apparatus 125 may also be the working manners of the first driving apparatus 115 and the second driving apparatus 125 in the foregoing mechanical steering mode.

Optionally, in the steer-by-wire mode, because the second clutch 150 is in the disengaged state, the steering wheel cannot directly drive, by using a mechanical connection, the inner-side wheel and the outer-side wheel to perform steering; in other words, the driver cannot obtain, from the steering wheel, real road sense when the inner-side wheel and the outer-side wheel are controlled to perform steering. Therefore, to improve driving sense of the driver, the driving apparatus 151 may be controlled to work, and the road sense is simulated and is fed back to the driver by using the steering wheel 1.

The steering mechanism and the steering system in the embodiments of this application are described above with reference to FIG. 1 to FIG. 3. A control method in the embodiments of this application is described below with reference to FIG. 4. It should be noted that the method shown in FIG. 4 may cooperate with any steering mechanism and any steering system in the embodiments of this application.

Figure 4:
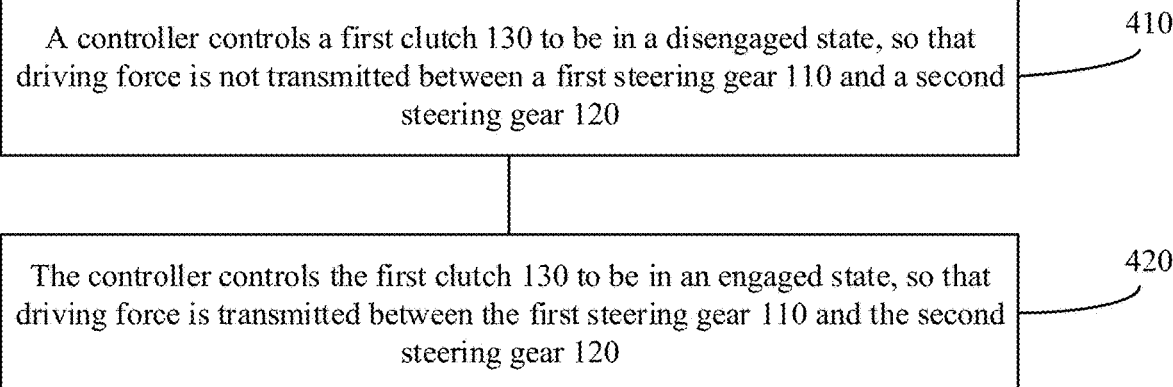
FIG. 4 is a flowchart of a control method according to an embodiment of this application.

FIG. 4 is a flowchart of a control method according to an embodiment of this application. It should be understood that the method shown in FIG. 4 may be performed by a controller 410 in a steering system, for example, may be performed by an electronic control unit (electronic control unit, ECU) in the steering system, or may be performed by another apparatus that has a control function. This is not limited in this embodiment of this application. The method shown in FIG. 4 includes step 410 and step 420.

410: The controller controls a first clutch 130 to be in a disengaged state, so that driving force is not transmitted between a first steering gear 110 and a second steering gear 120.

420: The controller controls the first clutch 130 to be in an engaged state, so that driving force is transmitted between the first steering gear 110 and the second steering gear 120.

Optionally, that the controller controls the first clutch 130 to be in the disengaged state or that the controller controls the first clutch 130 to be in the engaged state may be performed by the controller by sending a control instruction to the first clutch 130.

Optionally, in an embodiment, the first steering gear 110 includes a first transmission member 111 and a second transmission member 112 that are in a transmission connection, and the first transmission member 111 is configured to apply obtained first driving force to an outer-side wheel 114 by using the second transmission member 112; and the second steering gear 120 includes a third transmission member 121 and a fourth transmission member 122 that are in a transmission connection, the third transmission member 121 is configured to apply obtained second driving force to an inner-side wheel 124 by using the fourth transmission member 122, and the first transmission member 111 and the third transmission member 121 are connected by using the first clutch 130.

Optionally, in an embodiment, step 420 includes: The controller controls the first clutch 130 to be in the engaged state, so that the first driving force obtained by the first transmission member 111 is transmitted to the third transmission member 121 by using the first clutch 130.

Optionally, in an embodiment, the steering mechanism includes a first driving apparatus 115, and the method further includes: The controller controls the first driving apparatus 115 to provide third driving force for the second transmission member 112, to drive the second transmission member 112 to move, so that the second transmission member 112 transmits the third driving force to the first transmission member 111, and the first transmission member 111 obtains the first driving force.

Optionally, in an embodiment, step 420 includes: The controller controls the first clutch 130 to be in the engaged state, so that the second driving force obtained by the third transmission member 121 is transmitted to the first transmission member 111 by using the first clutch 130.

Optionally, in an embodiment, the steering mechanism further includes a second driving apparatus 125, and the method further includes: The controller controls the second driving apparatus 125 to provide fourth driving force for the fourth transmission member 122 to drive the fourth transmission member 122 to move and transmit the fourth driving force to the third transmission member 121, so that the third transmission member 121 obtains the second driving force.

Optionally, in an embodiment, the steering system further includes a first driving apparatus 115 and a second driving apparatus 125, and the method further includes: When the first clutch 130 is in the disengaged state, the controller controls the first driving apparatus 115 to drive the second transmission member 112 to move, to control steering force applied to the outer-side wheel 114, and/or the controller controls the second driving apparatus 125 to drive the fourth transmission member 122 to move, to control steering force applied to the inner-side wheel 124.

The control method in the embodiments of this application is described above with reference to FIG. 4. An apparatus in the embodiments of this application is described below with reference to FIG. 5 and FIG. 6. It should be noted that the apparatus shown in FIG. 5 and FIG. 6 may implement the steps in the foregoing methods. For brevity, details are not described herein again.

Figure 5:
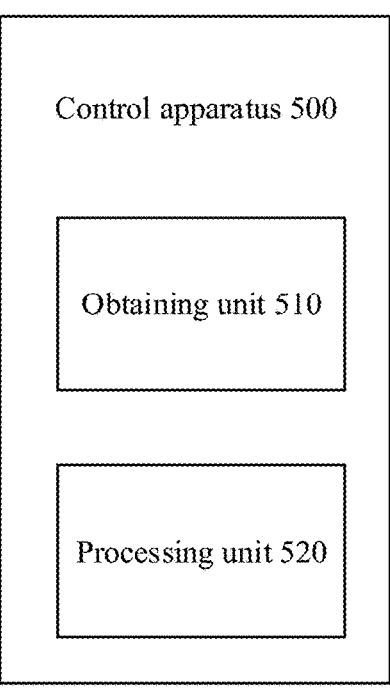
FIG. 5 is a schematic diagram of a control apparatus according to an embodiment of this application.

FIG. 5 is a schematic diagram of a control apparatus according to an embodiment of this application. A control apparatus 500 shown in FIG. 5 includes an obtaining unit 510 and a processing unit 520. The obtaining unit 510 is configured to obtain information, to determine whether a first clutch 130 is controlled in a disengaged state or an engaged state. Optionally, the information may be a control instruction for a clutch working status that is sent by another processor to the control apparatus, and the information may alternatively be a working status of a current steering system. This is not limited in this embodiment of this application.

The processing unit 520 is configured to control the first clutch 130 to be in a disengaged state, so that driving force is not transmitted between a first steering gear 110 and a second steering gear 120.

The processing unit 520 is further configured to control the first clutch 130 to be in an engaged state, so that driving force is transmitted between the first steering gear 110 and the second steering gear 120.

Optionally, in an embodiment, the first steering gear 110 includes a first transmission member 111 and a second transmission member 112 that are in a transmission connection, and the first transmission member 111 is configured to apply obtained first driving force to an outer-side wheel 114 by using the second transmission member 112; and the second steering gear 120 includes a third transmission member 121 and a fourth transmission member 122 that are in a transmission connection, the third transmission member 121 is configured to apply obtained second driving force to an inner-side wheel 124 by using the fourth transmission member 122, and the first transmission member 111 and the third transmission member 121 are connected by using the first clutch 130.

Optionally, in an embodiment, the processing unit 520 is further configured to control the first clutch 130 to be in the engaged state, so that the first driving force obtained by the first transmission member 111 is transmitted to the third transmission member 121 by using the first clutch 130.

Optionally, in an embodiment, a steering system includes a first driving apparatus 115, and the processing unit 520 is further configured to control the first driving apparatus 115 to provide third driving force for the second transmission member 112, to drive the second transmission member 112 to move, so that the second transmission member 112 transmits the third driving force to the first transmission member 111, and the first transmission member 111 obtains the first driving force.

Optionally, in an embodiment, the processing unit 520 is further configured to control the first clutch 130 to be in the engaged state, so that the second driving force obtained by the third transmission member 121 is transmitted to the first transmission member 111 by using the first clutch 130.

Optionally, in an embodiment, a steering system includes a second driving apparatus 125, and the processing unit 520 is further configured to control the second driving apparatus 125 to provide fourth driving force for the fourth transmission member 122, to drive the fourth transmission member 122 to move and transmit the fourth driving force to the third transmission member 121, so that the third transmission member 121 obtains the second driving force.

Optionally, in an embodiment, a steering system includes a first driving apparatus 115 and a second driving apparatus 125, and the processing unit 520 is further configured to: when the first clutch 130 is in the disengaged state, control the first driving apparatus 115 to drive the second transmission member 112 to move, to control steering force applied to the outer-side wheel 114; and/or control the second driving apparatus 125 to drive the fourth transmission member 122 to move, to control steering force applied to the inner-side wheel 124.

Optionally, in an embodiment, the first transmission member 111 is a first gear, and the second transmission member 112 is a first rack; or the third transmission member 121 is a second gear, and the fourth transmission member 122 is a second rack.

Figure 6:
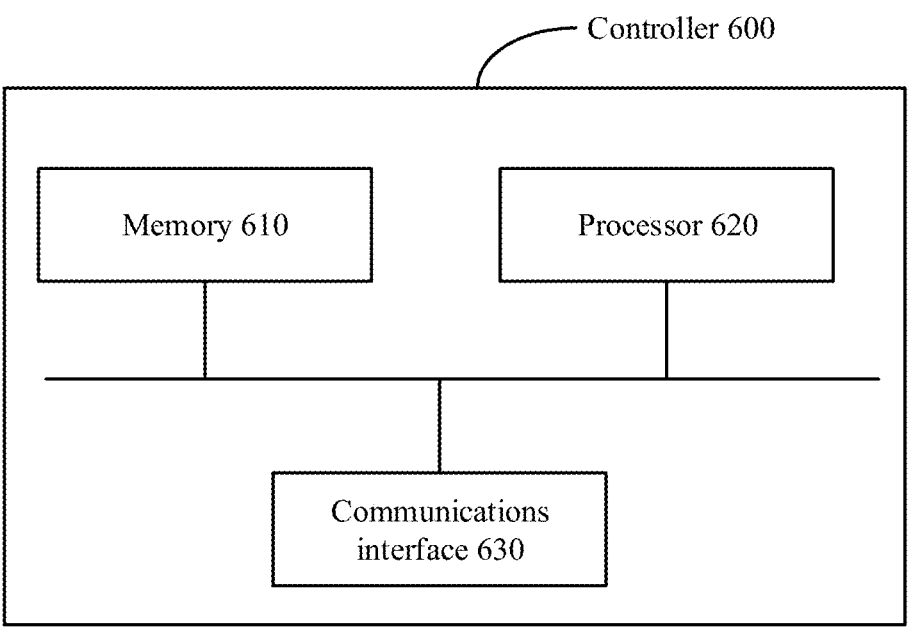
FIG. 6 is a schematic diagram of a controller according to an embodiment of this application.

In an optional embodiment, the processing unit 520 may be a processor 620, the obtaining unit 510 may be a communications interface 630, and the controller apparatus may further include a memory 610, specifically as shown in FIG. 6. It should be understood that a controller 600 shown in FIG. 6 may alternatively be the foregoing controller 410.

FIG. 6 is a schematic block diagram of a controller according to another embodiment of this application. A controller 600 shown in FIG. 6 may include a memory 610, a processor 620, and a communications interface 630. The memory 610, the processor 620, and the communications interface 630 are connected by using an internal connection path. The memory 610 is configured to store instructions. The processor 620 is configured to execute the instructions stored in the memory 610, to control an input/output interface 630 to receive/send at least some parameters of a second channel model. Optionally, the memory 610 may be coupled to the processor 620 by using an interface, or integrated with the processor 620.

It should be noted that the communications interface 630 uses a transceiver apparatus such as, but not limited to, a transceiver to implement communication between a communications device and another device or a communications network. The communications interface 630 may further include an input/output interface (input/output interface).

In an implementation process, steps in the foregoing methods may be implemented by using a hardware integrated logic circuit in the processor 620, or by using instructions in a form of software. The methods disclosed with reference to the embodiments of this application may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 610, and the processor 620 reads information in the memory 610 and completes the steps in the foregoing methods in combination with hardware of the processor. To avoid repetition, details are not described herein again.

It should be understood that, the processor in the embodiments of this application may be a central processing unit (central processing unit, CPU). The processor may alternatively be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be understood that in the embodiments of this application, the memory may include a read-only memory and a random access memory, and provide instructions and data to the processor. A part of the processor may further include a non-volatile random access memory. For example, the processor may further store information of a device type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

It should be understood that, in the embodiments of this application, the engaged state may include a fully-engaged state and a half-engaged state.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be understood that the driving apparatus in the embodiments of this application may be a motor or another apparatus that can provide driving force. This is not limited in the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A steering mechanism, comprising:
a first steering gear, wherein the first steering gear is configured to convert obtained driving force to transmit driving force to an outer-side wheel during steering, to control steering force applied to the outer-side wheel; and
a second steering gear, wherein the second steering gear is configured to convert obtained driving force to transmit driving force to an inner-side wheel during steering, to control steering force applied to the inner-side wheel, wherein:
the first steering gear and the second steering gear are connected by a first clutch, and if the first clutch is in a disengaged state, driving force is not transmitted between the first steering gear and the second steering gear, or if the first clutch is in an engaged state, driving force is transmitted between the first steering gear and the second steering gear;
the steering mechanism comprises a driving apparatus;
the driving apparatus drives a rack to move by providing a rack-driving force for the rack, wherein the rack is comprised in the first steering gear or the second steering gear;
the rack transmits the rack-driving force to a first gear to allow the first gear to obtain a gear-driving force, wherein the rack and the first gear are comprised in a same steering gear; and
when the first clutch is in the engaged state, the first gear transmits the gear-driving force to a second gear by using the first clutch, wherein the first gear and the second gear are comprised in different steering gears.

2. The steering mechanism according to claim 1, wherein:
the first steering gear comprises a first transmission member and a second transmission member that are in a transmission connection, and the first transmission member is configured to apply obtained first driving force to the outer-side wheel by using the second transmission member; and
the second steering gear comprises a third transmission member and a fourth transmission member that are in a transmission connection, the third transmission member is configured to apply obtained second driving force to the inner-side wheel by using the fourth transmission member, and the first transmission member and the third transmission member are connected by the first clutch.

3. The steering mechanism according to claim 2, wherein the first driving force obtained by the first transmission member is the gear-driving force.

4. The steering mechanism according to claim 3, wherein the second transmission member is the rack, the first transmission member is the first gear, and the third transmission member is the second gear.

5. The steering mechanism according to claim 2, wherein the second driving force obtained by the third transmission member is the gear-driving force.

6. The steering mechanism according to claim 5, wherein the fourth transmission member is the rack, the third transmission member is the first gear, and the first transmission member is the second gear.

7. The steering mechanism according to claim 2, wherein the steering mechanism comprises a first driving apparatus and a second driving apparatus, and wherein at least one of the following occurs:
when the first clutch is in the disengaged state, the first driving apparatus drives the second transmission member to move, to control the steering force applied to the outer-side wheel; or
the second driving apparatus drives the fourth transmission member to move, to control the steering force applied to the inner-side wheel.

8. The steering mechanism according to claim 7, wherein:
the first transmission member is a first gear, and the second transmission member is a first rack; or
the third transmission member is a second gear, and the fourth transmission member is a second rack.

9. A steering system, comprising an inner-side wheel, an outer-side wheel, and a steering mechanism, wherein the steering mechanism is configured to control rotation of the inner-side wheel and the outer-side wheel, and wherein the steering mechanism comprises:
a first steering gear, wherein the first steering gear is configured to convert obtained driving force to transmit driving force to an outer-side wheel during steering, to control steering force applied to the outer-side wheel; and
a second steering gear, wherein the second steering gear is configured to convert obtained driving force to transmit driving force to an inner-side wheel during steering, to control steering force applied to the inner-side wheel, wherein;
the first steering gear and the second steering gear are connected by a first clutch, and if the first clutch is in a disengaged state, driving force is not transmitted between the first steering gear and the second steering gear, or if the first clutch is in an engaged state, driving force is transmitted between the first steering gear and the second steering gear;
the steering mechanism comprises a driving apparatus;
the driving apparatus drives a rack to move by providing a rack-driving force for the rack, wherein the rack is comprised in the first steering gear or the second steering gear;
the rack transmits the rack-driving force to a first gear to allow the first gear to obtain a gear-driving force, wherein the rack and the first gear are comprised in a same steering gear; and
when the first clutch is in the engaged state, the first gear transmits the gear-driving force to a second gear by using the first clutch, wherein the first gear and the second gear are comprised in different steering gears.

10. The steering system according to claim 9, wherein the steering system further comprises a first steering wheel, the first steering wheel is connected to a first transmission member by using a first steering drag link, a second clutch is disposed on the first steering drag link, and if the second clutch is in an engaged state, the first steering wheel provides a first driving force for the first transmission member by using the first steering drag link, or if the second clutch is in a disengaged state, the first steering wheel is unable to provide the first driving force for the first transmission member by using the first steering drag link.

11. A control method for a steering system, wherein the steering system comprises:

a first steering gear, and the first steering gear is configured to convert obtained driving force to transmit driving force to an outer-side wheel during steering, to control steering force applied to the outer-side wheel; and a second steering gear, wherein the second steering gear is configured to convert obtained driving force to transmit driving force to an inner-side wheel during steering, to control steering force applied to the inner-side wheel, and the first steering gear and the second steering gear are connected by a first clutch, wherein the control method comprises:

controlling, by a controller, the first clutch to be in a disengaged state to disallow driving force to be transmitted between the first steering gear and the second steering gear; and controlling, by the controller, the first clutch to be in an engaged state to allow driving force to be transmitted between the first steering gear and the second steering gear, wherein the steering system comprises a driving apparatus, and wherein the controlling, by the controller, the first clutch to be in an engaged state comprises:

controlling, by the controller, the driving apparatus to provide a rack-driving force for a rack to drive the rack to move, allowing the rack to transmit the rack-driving force to a first gear to allow the first gear to obtain a gear-driving force, wherein the rack is comprised in the first steering gear or the second steering gear, and wherein the rack and the first gear are comprised in a same steering gear; and controlling, by the controller, the first clutch to be in the engaged state to allow the gear-driving force to be transmitted to a second gear by using the first clutch, wherein the first gear and the second gear are comprised in different steering gears.

12. The method according to claim 11, wherein:

the first steering gear comprises a first transmission member and a second transmission member that are in a transmission connection, and the first transmission member is configured to apply obtained first driving force to the outer-side wheel by using the second transmission member; and the second steering gear comprises a third transmission member and a fourth transmission member that are in a transmission connection, the third transmission member is configured to apply obtained second driving force to the inner-side wheel by using the fourth transmission member, and the first transmission member and the third transmission member are connected by the first clutch.

13. The method according to claim 12, wherein the first driving force obtained by the first transmission member is the gear-driving force.

14. The method according to claim 13, wherein the second transmission member is the rack, the first transmission member is the first gear, and the third transmission member is the second gear.

15. The method according to claim 13, wherein the steering system comprises a first driving apparatus and a second driving apparatus, and the method further comprises at least one of the following:

when the first clutch is in the disengaged state, controlling, by the controller, the first driving apparatus to drive the second transmission member to move, to control the steering force applied to the outer-side wheel; or controlling, by the controller, the second driving apparatus to drive the fourth transmission member to move, to control the steering force applied to the inner-side wheel.

16. The method according to claim 15, wherein:

the first transmission member is a first gear, and the second transmission member is a first rack; or the third transmission member is a second gear, and the fourth transmission member is a second rack.

17. The method according to claim 12, wherein the second driving force obtained by the third transmission member is the gear-driving force.

18. The method according to claim 17, wherein the fourth transmission member is the rack, the third transmission member is the first gear, and the first transmission member is the second gear.

19. A control apparatus for a steering system, wherein the steering system comprises:

a first steering gear, and the first steering gear is configured to convert obtained driving force to transmit driving force to an outer-side wheel during steering, to control steering force applied to the outer-side wheel; and a second steering gear, wherein the second steering gear is configured to convert obtained driving force to transmit driving force to an inner-side wheel during steering, to control steering force applied to the inner-side wheel, and the first steering gear and the second steering gear are connected by a first clutch, wherein the control apparatus comprises:

at least one processor; and one or more memories coupled to the at least one processor and storing programming instructions for execution by the at least one processor to:

control the first clutch to be in a disengaged state to disallow driving force to be transmitted between the first steering gear and the second steering gear; and control the first clutch to be in an engaged state to allow driving force to be transmitted between the first steering gear and the second steering gear, wherein the steering system comprises a driving apparatus, and wherein controlling the first clutch to be in the engaged state comprises:

controlling the driving apparatus to provide a rack-driving force for a rack to drive the rack to move, allowing the rack to transmit the rack-driving force to a first gear to allow the first gear to obtain a gear-driving force, wherein the rack is comprised in the first steering gear or the second steering gear, and wherein the rack and the first gear are comprised in a same steering gear; and controlling the first clutch to be in the engaged state to allow the gear-driving force to be transmitted to a second gear by using the first clutch, wherein the first gear and the second gear are comprised in different steering gears.

\* \* \* \* \*